May 31, 1960

D. G. MOORE 2,939,131

AIRBORNE RADAR SYSTEM

Filed June 28, 1957

INVENTOR.
Donald G. Moore
BY
Attorneys

INVENTOR.
Donald G. Moore.

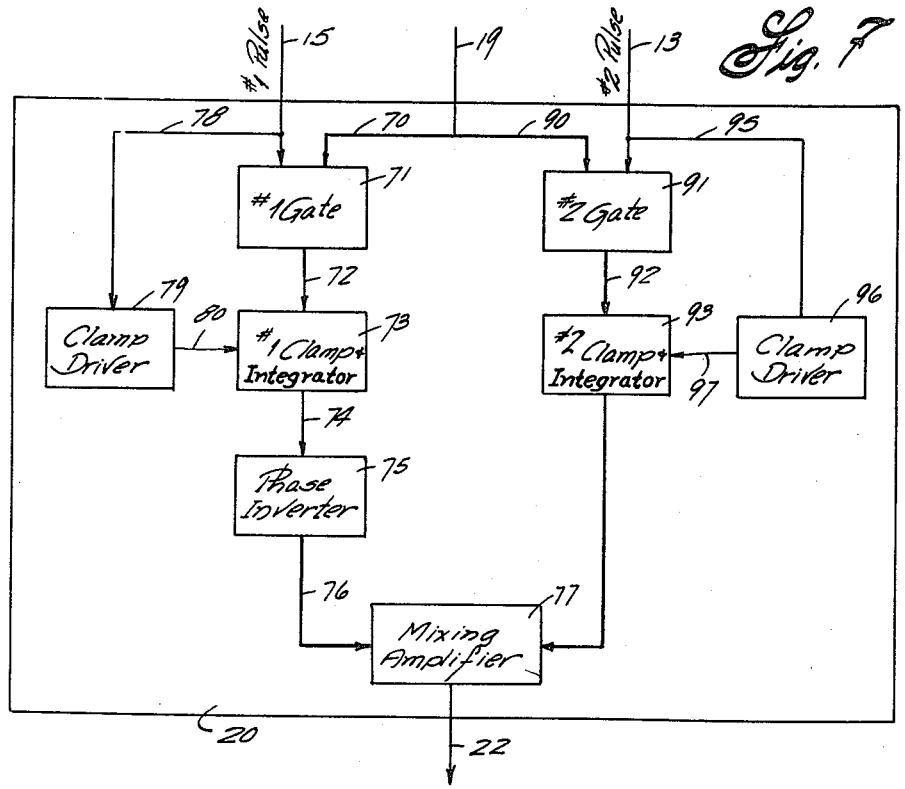
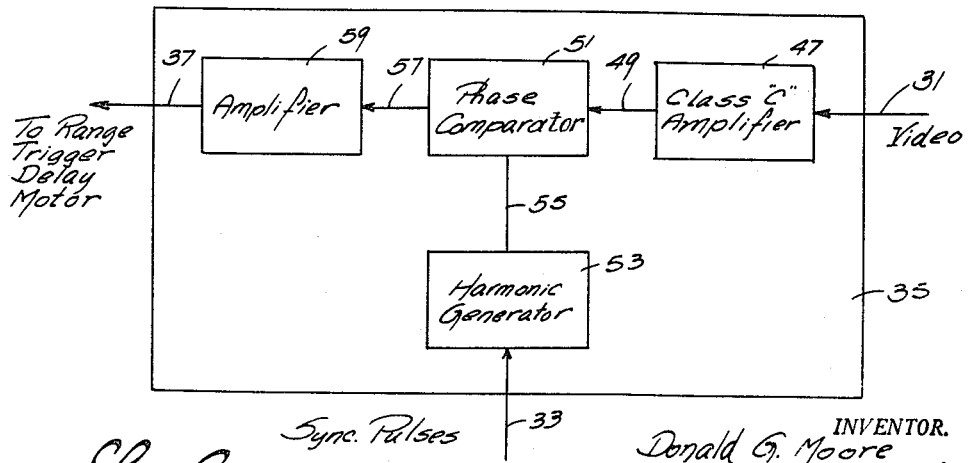

United States Patent Office 2,939,131
Patented May 31, 1960

2,939,131

AIRBORNE RADAR SYSTEM

Donald G. Moore, St. Joseph, Mich., assignor, by mesne assignments, to the United States of America as represented by the Secretary of the Navy Filed June 28, 1957, Ser. No. 668,823

1 Claim. (Cl. 343—7.4)

This invention relates to airborne radar systems. In particular it relates to relatively narrow-vertical-beam systems which, when used for ground target observation, illuminate only a small increment of the total range.

One object of this invention is to provide means for automatically adjusting the antenna elevation angle, in such a narrow-vertical-beam radar system, so as to illuminate the target area below corresponding to the position in range of the range increment to be displayed on the indicator, even though the plane changes altitude or there are gradual changes in terrain.

Another object is to provide means for automatically adjusting the position in range of the increment to be displayed on the indicator to correspond to the range of the target area being illuminated by an antenna remaining at a given elevation angle even though the plane changes altitude or there are gradual changes in terrain.

Still another object is to provide means in a narrow-vertical-beam radar system for automatically adjusting the position in range of the range increment, to be displayed on the indicator, so as to keep a given target in view on the indicator while at the same time automatically adjusting the antenna elevation angle to illuminate the corresponding target area even though the plane changes altitude or the distance between the plane and target changes.

The foregoing and other objects of this invention will best be understood from the following description of some exemplifications thereof, reference being had to the accompanying drawings, wherein.

Figure 4:
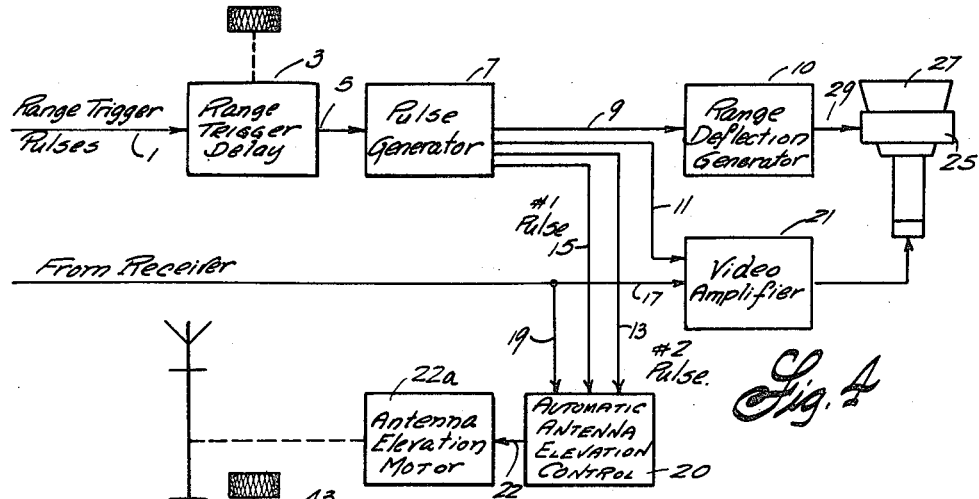
Figures 4–6 are block diagrams of three particular arrangements of the system.

Figure 4–a illustrates the time sequence of the various pulses;

Figure 7 is a block diagram of the automatic antenna elevation or range increment control portion of the system;

Figure 8 is a block diagram of the automatic range tracker.

As an aid to understanding the operation, let us assume a particular type of antenna and a corresponding type of display. Let us choose an antenna with a vertical beamwidth of several degrees and a narrower horizontal beam which is capable of being scanned horizontally. The display might be a B type presentation displaying an increment of range in one dimension and scanned azimuth in the other with the video signals appearing as brightness information on the grid of the cathode-ray tube.

Figure 1:
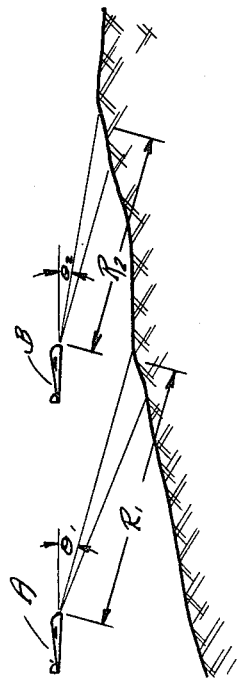

The sketch in Figure 1 shows one embodiment of this invention wherein the plane is searching a given strip of land, possibly in its path. The indicator is adjusted to display a range increment beginning at, say, 10 miles and ending at, say, 12 miles. It is the object of the device in the first arrangement, shown in Figure 1, to change the elevation angle of the antenna so as to keep the center of the area illuminated by the beam at a fixed range R which, in this example, would be 11 miles. Notice in Figure 1 that when the plane moves from position A to position B, $\theta$ automatically changes to maintain R constant. The two positions represent a change in either terrain or altitude.

Figure 2:
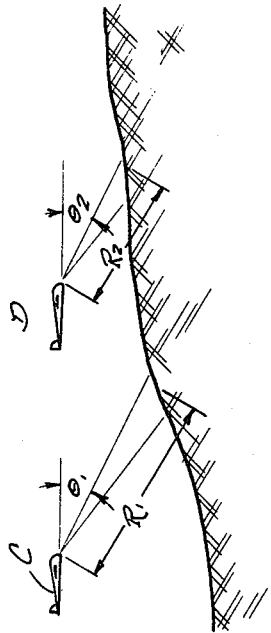
Figures 1–3 are sketches of the airplane, ground, and antenna pattern, illustrating the types of operation.
Figure 2A:
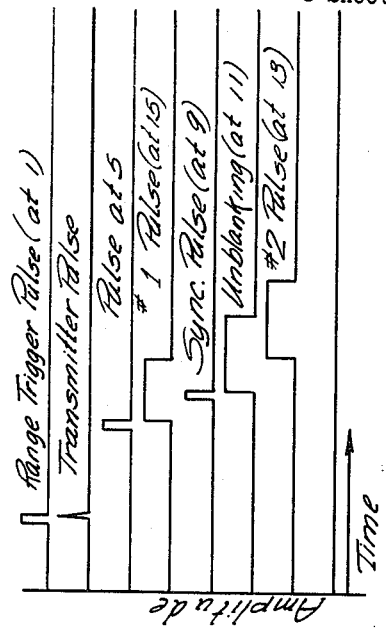

In the arrangement shown in Figure 2 the operation is also of the nature of search, but the angle $\theta$ remains fixed which forces R to change with variations in altitude or terrain. The device being described will automatically cause the range increment to change its position so that if in position C in Figure 2 the increment displayed is from 10 to 12 miles, it might change so as to begin, at, say, 8 miles and end at 10 miles when in position D.

Figure 3:
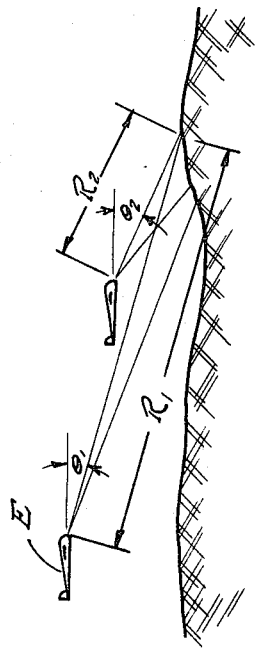

The operation shown in Figure 3 might be that which could occur when the searching aircraft detected a target which deserved scrutinizing for a longer period of time than occurs in the conditions shown in Figure 1 or Figure 2. This same operation might well apply to a radar-equipped commercial airplane in which the object is to keep a distant airport on the indicator screen as the plane approaches it in order to keep track of the traffic conditions, etc.

No means is included in this disclosure for automatic azimuth control. It might be desirable to have the pilot fly the plane in such a way as to keep the target centered in azimuth while the automatic functions keep the range increment and the antenna at the correct positions. It should be noticed that for a constant beamwidth, the size of the area of ground illuminated varies as the angle $\theta$ and range R vary. The automatic equipment can be adjusted so that it will still function even though the area does change, or means could be incorporated to vary the beamwidth to keep the area nearly constant.

The block diagram in Figure 4 shows the arrangement for accomplishing the first object of this invention such as is illustrated in Figure 1, i.e. where the range is kept at a fixed distance, or $R_1=R_2$. Range trigger pulses, which may also trigger the transmitter, are fed via path 1 to the range trigger delay unit 3 which produces a variable delay corresponding to the shaft rotation. The output of said variable delay unit is fed via path 5 to pulse generator 7 which generates a pulse, identified as the No. 1 pulse, which is fed via path 15 to the automatic antenna elevation control 20, a synchronizing pulse which is fed via path 9 to range deflection generator 10, an unblanking pulse which is fed via path 11 to video amplifier 21, and a number 2 pulse which is fed via path 13 to the automatic antenna elevation control unit 20.

The approximate width and relative timing of these pulses are specifically illustrated in Figure 4a of the drawing. It will be seen therein that the radar transmitter pulse initiates a simultaneous range trigger pulse at 1. After a predetermined interval controlled manually or in a manner more specifically described hereinafter by the range trigger delay device 3, the relatively narrow pulse at 5 is produced. By means of the pulse generator 7, the pulse at 5 marks the leading edge of the #1 pulse at 15 which as is shown takes the form of a substantially square wave pulse of relatively long duration. At the midpoint of the #1 pulse the synchronizing pulse at 9 and the relatively broad unblanking pulse at 11 are then produced by generator 7. Coincident with the trailing edge of the #1 pulse, the #2 pulse at 13 of equal time duration is initiated. The trailing edge of the unblanking pulse at 11 coincides in time with the midpoint of the #2 pulse.

The output of range deflection generator 10 is fed via path 29 to deflecting element 25 of cathode-ray tube 27. Azimuth deflection is produced in synchronism with the azimuth scan of the antenna, in a particular example of this invention, by means not shown. Video signals from the receiver are fed via path 17 to video amplifier 21 and thence via path 23 to the brightness controlling element of cathode-ray tube 27 in the conventional manner. The output of the automatic antenna elevation control 20 is fed via path 22 to the antenna elevation motor, 22a, but which keeps the antenna pointing, in elevation, to the area which corresponds to the range increment being displayed.

The block diagram of Figure 7 shows the elements comprising the automatic antenna elevation control 20 in Figure 4. The No. 1 pulse (15), whose relative time is illustrated in Figure 4a, is fed to the No. 1 gate 71 where it momentarily enables the gate to pass the video signal fed to the gate via path 70. The No. 1 pulse is also fed via path 78 to the clamp driver 79 which in turn keys clamp 73 via path 80. The output of No. 1 gate is fed via path 72 to the clamp 73. At the time of occurrence of the No. 1 pulse, the gate 71 is opened and clamp 73 is operated. The result is that from immediately after the end of the No. 1 pulse until the occurrence of the next pulse, the output 74 of clamp 73 is proportional to the portion of the video signal at 70 integrated over the time of occurrence of the No. 1 pulse. This signal 74 is fed to a D.C.-coupled mixing amplifier 77, via phase inverter 75 and path 76.

The operation of number 2 gate 91, number 2 clamp 93, clamp driver 96 via paths 92, 95 and 97 is identical with the operation of number 1 gate, number 1 clamp, and clamp driver just described except that the number 2 pulse (13) occurs later than the number 1 pulse.

The output of clamp 93 is fed via path 94 directly to the mixing amplifier without phase inversion. If the video signal integrated over the time of the number 1 pulse equals the signal integrated over the time of the number 2 pulse, the system can be said to be in balance. The output 22 of amplifier 77 will then be at a D.-C. reference voltage which can, if desired, be adjusted to zero with respect to ground. If the video signal during the time of the number 1 pulse does not equal that integrated during the time of the number 2 pulse, the output of the mixing amplifier 77 will vary above or below the reference voltage. The amount of said variation will of course, be proportional to the magnitude of the inequality of the video signal at the two time intervals and the sense of the variation is determined by the sense of the inequality.

Figure 5:
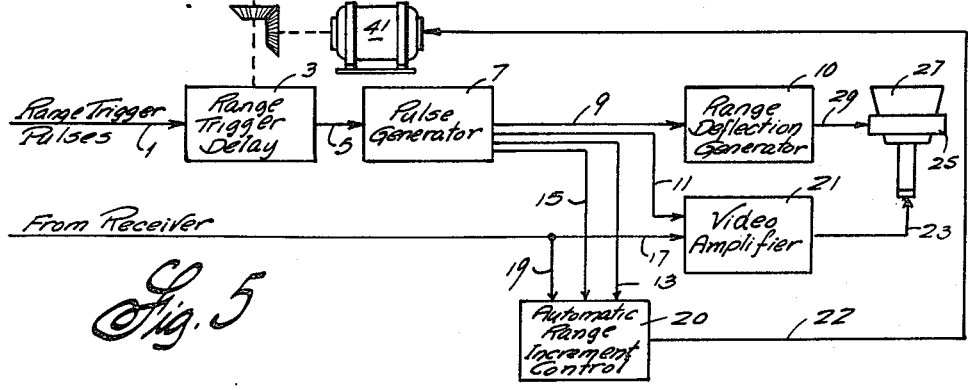

The block diagram in Figure 5 shows an arrangement for accomplishing the second object of this invention such as is illustrated in Figure 2 and is similar to the diagram shown in Figure 4 except that the automatic antenna elevation control 20 in Figure 5 and the output therefrom is fed via path 22 to control motor 41 that rotates shaft 43 of the range trigger delay unit 3 in such a way as to control the range increment being displayed so that it corresponds to the area being illuminated.

Figure 6:
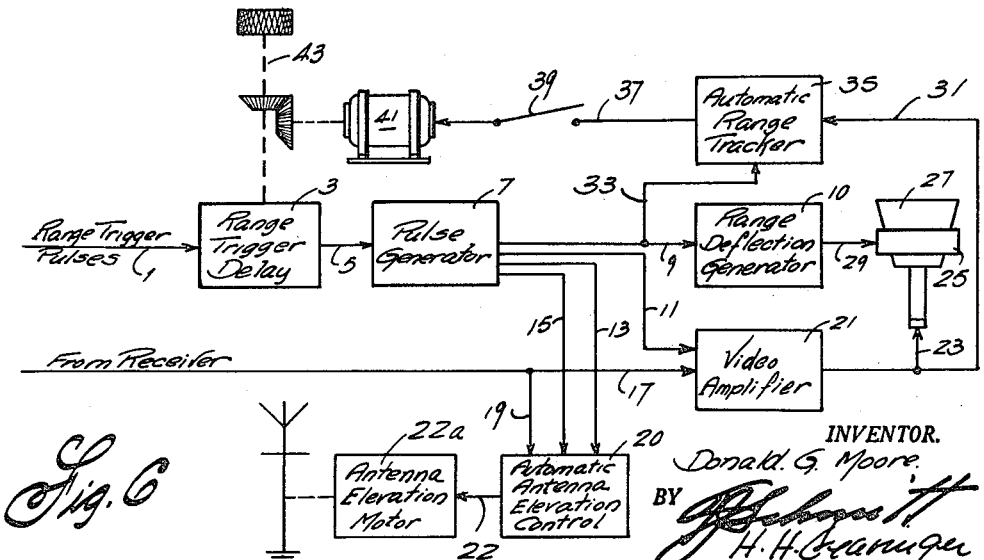

The block diagram in Figure 6 shows means for accomplishing the third object of this invention such as is illustrated in Figure 3 and is similar to the diagram in Figure 4 except that the automatic range tracker 35 has been added. It receives video signals via path 31 and synchronizing pulses via path 33 and transmits a signal via path 37 through switch 39, when it is closed, to motor 41 which rotates the shaft 43 of the range trigger delay unit 3 in such a manner that it automatically controls the range increment being displayed so that a selected target is tracked in range. The automatic antenna elevation control 20 operates simultaneously to keep the antenna pointed, in elevation, at the corresponding area.

The block diagram in Figure 8 shows a possible arrangement of the automatic range tracker, which is unit 35 in Figure 6. In Figure 8, synchronizing pulses from the pulse generator are fed via path 33 to harmonic generator 53. The harmonic generator might comprise a high-Q tuned circuit and amplifier or possibly an oscillator synchronized in phase by the synchronizing pulses. The output of harmonic generator 53 is a series of sine waves of such a frequency that several cycles, say 10, occur during the time of the range increment being displayed. This output is fed via path 55 to phase comparator 51. Signal from the video amplifier is fed via path 31 to a class C amplifier 47. The class C amplifier has an automatically varying bias such that only the strongest target which is picked up during unblanking time (within the range increment) is amplified and fed via path 49 to phase comparator 51. The output of the phase comparator 51 is a signal whose amplitude is proportional to the departure of the video pulse (at 49) from a given phase position on the sine wave (at 55). The sign of the output voltage at 57 depends on whether the video pulse leads or lags the phase reference on the sine wave. The phase comparator output is fed via path 57 to a D.C.-coupled amplifier 59 which produces an output signal capable of controlling motor 41 in Figure 6.

The operation of the automatic range tracking portion of the system is as follows: When switch 39 in Figure 6 is closed a servo loop is completed. The phase of the strongest target signal in the range increment is compared with the phase of one cycle of the reference wave from the harmonic generator. If the target pulse does not occur at the time corresponding to the equilibrium point of the sine wave (for example, at the point where the wave crosses the axis with a positive slope), the motor is energized and changes the range trigger delay. The change in range trigger delay changes the position (in range) of the range increment and also the phase, with respect to the transmitter pulse, of the sine wave reference signal. The servo loop thereby locks the nearest cycle of the reference sine wave to the target pulse and automatically changes the timing of the sine wave as the distance to the target changes which causes the range increment being displayed to follow the target in range.

The automatic range tracking system might be improved for some types of operating conditions by the addition of a simple memory device. If in Figure 6, the output 37 of the unit were used to control a motor which in turn, by moving the arm of a potentiometer for example, controlled the speed of the existing motor 41, automatic tracking could continue through complete fading of all targets.

Obviously many modifications and variations of the present invention are possible in the light of the above teachings. It is therefore to be understood that within the scope of the appended claims the invention may be practiced otherwise than as specifically described.

What is claimed is:

In combination with radar equipment for radiating a transmitted pulse from an antenna to a target and receiving return echo signals therefrom apparatus comprising an adjustable electrical delay unit; means responsive to the transmitted pulse for energizing the delay unit; a pulse generator coupled to the output of the delay unit, said pulse generator producing two successive gating pulses a time interval after the transmitted pulse controlled by the delay unit; said pulse generator also producing a range increment pulse which is initiated a predetermined interval before the first gating pulse is terminated and is terminated a similar interval after the second gating pulse is initiated; a circuit which compares the radar echo signal energy received throughout the range increment interval during the successive gating pulses; means coupled to the output of the comparison circuit for controlling the elevational angle of the antenna; a harmonic generator which is coupled to the pulse generator and which becomes energized when the range increment pulse is initiated; a phase comparator circuit which is energized by the output of the harmonic generator and the radar echo signal during the range movement interval and provides an output that is a measure of the coincidence of the echo signal with a predetermined phase angle of a harmonic of the harmonic generator; and means coupled to the output of the phase comparator circuit for controlling the adjustable setting of the delay unit.

References Cited in the file of this patent

UNITED STATES PATENTS 2,617,093   Fyler _____ Nov. 4, 1952